F. L. RAPSON.
ANTIFRICTION NUT AND SCREW GEARING.
APPLICATION FILED MAY 28, 1918.
1,367,499.
Patented Feb. 1, 1921.
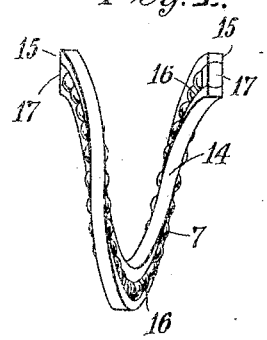
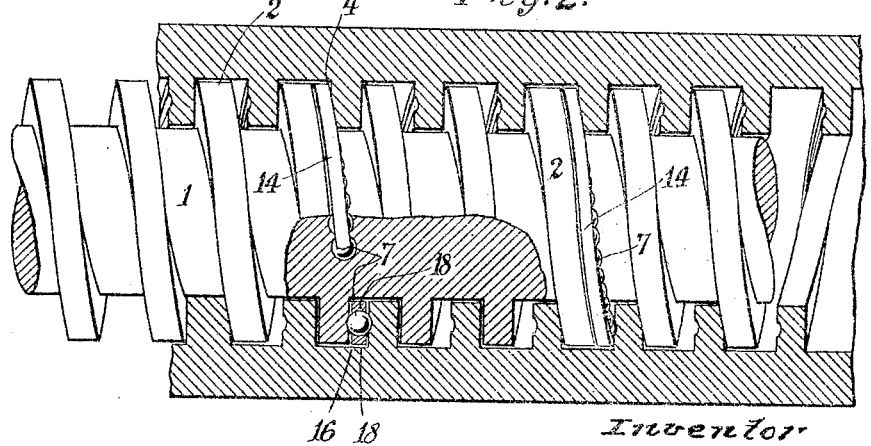

UNITED STATES PATENT OFFICE.

FRED LIONEL RAPSON, OF LIVERPOOL, ENGLAND.

ANTIFRICTION NUT AND SCREW GEARING.

1,367,499.      Specification of Letters Patent.      Patented Feb. 1, 1921.

Application filed May 28, 1918. Serial No. 237,130.

*To all whom it may concern:*

Be it known that I, FRED LIONEL RAPSON, a subject of His Majesty the King of England, and resident of Liverpool, in the county of Lancaster, Kingdom of England, have invented a certain new and useful Antifriction Nut and Screw Gearing, of which the following is a specification.

This invention relates to a new or improved method of anti-friction nut and screw gearing.

The invention has for its object to provide an improved nut and screw gearing in which the friction will be reduced to the minimum to insure very easy operation.

A further object is to provide improved anti-friction screw gearing which may be used in connection with any mechanism or machinery, such as, lifting jacks, lathes, training of guns, steering of automobiles or ships, planing machines, or where two coöperating surfaces are adapted to be moved relatively to one another.

The invention will now be described with reference to the accompanying drawings in which:—

Figure 1 is a perspective view of a clip or runner for the thrust balls;

Fig. 2 is a sectional elevation of nut and screw gearing with two of the runners shown in Fig. 1 in position.

According to a preferred form of this invention as shown in Figs. 1 and 2 a number of interposed thrust rollers or balls 7 are mounted in one or a number of spiral cages, clips or runners 14 which are disposed between the sides of the threads 2 and 4 in the rod 1 and the nut or sleeve 3 respectively. The cage 14 is preferably formed from an annulus of metal, of suitable thickness, which is divided or cut transversely at 15 so that it can be bent to form a spiral or helix. The rollers or balls 7 are contained in a groove 16 cut in the annulus and are kept in position by the closed ends 17 at the divided portion of the annulus. The opposite sides 18 of the groove 16 may be shaped or otherwise formed to hold the balls 7 loosely in position. Upon the rotation of the rod or shaft 1 or the nut or sleeve 3, the cage or cages 14 will travel, and the balls or rollers will rotate to reduce the friction between the coöperating faces of the thread.

What I claim is:—

1. A shaft provided with screw-threads, a nut carried by the shaft and having screw-threads to engage with the first named screw-threads, a spiral cage arranged between the two sets of screw-threads, and rolling elements held within the cage and engaging the two sets of screw-threads.

2. A shaft provided with screw-threads, a nut carried by the shaft and having screw-threads to engage with the first named screw-threads, a spiral cage arranged between the two sets of screw-threads and being formed from an annulus which is cut transversely and bent into the spiral form and rolling elements carried by the spiral cage and engaging the two sets of screw-threads.

3. A shaft provided with deep square screw-threads, said screw-threads being provided upon corresponding sides with grooves, a nut carried by the shaft and provided with deep square screw-threads which are provided upon corresponding sides with grooves, a spiral cage arranged between the two sets of screw-threads, and balls held within the spiral cage and operating within the grooves formed upon the sides of the two sets of screw-threads.

In testimony whereof I have hereunto signed my name.

FRED LIONEL RAPSON.